May 29, 1956 P. H. KUEVER 2,747,911
FOOD HANDLING AND SCRAPING TOOL FOR USE WITH GRILLS
Filed Sept. 30, 1954

INVENTOR.
PAUL H. KUEVER
BY *Elliott & Pastoriza*
ATTORNEYS

United States Patent Office 2,747,911
Patented May 29, 1956

2,747,911

FOOD HANDLING AND SCRAPING TOOL FOR USE WITH GRILLS

Paul H. Kuever, San Gabriel, Calif.

Application September 30, 1954, Serial No. 459,344

3 Claims. (Cl. 294—7)

This invention relates to a food handling and scraping tool for use with grills, and has particular application to the lifting and turning of such food, as well as the cleaning of food deposits from the grills.

The broiling or cooking of certain food products on grills, in both indoor and outdoor equipment, has increased in popularity as a method of augmenting the taste quality of foods formerly roasted or fried. This is particularly apparent in the trend towards out-of-door barbecuing. The grilling method necessarily requires that the food be turned to enable both sides of the product to come into contact with the heated gases or flame. After cooking is finished, the grill must usually be scraped, scrubbed, or otherwise cleaned preparatory to its use again.

Lifting and turning of the food, as well as any cleaning or scraping of the grill, has usually been accomplished by a common pancake turner or the like. Such a turner must be forced between the food and the grill rods in a manner that oftentimes results in the food or a portion thereof falling through the grill rods, sticking to the turner, or sliding to resist the lifting and turning action being exerted. An attendant problem is the subsequent cleaning of the grill, for the common turner is constructed such that it is only suitable for scraping food from the uppermost extremities of the grill rods, leaving undesirable and unsanitary food deposits on the sides and lower surfaces of the rod.

It is accordingly a primary object of this invention to provide a food handling and scraping tool suitable for lifting and turning food on a grill with ease, and which will act to prevent undesirable movement of the food along the surface of or through the grill rods and tend to inhibit any sticking between the tool and food product.

Another object is to provide a food handling and scraping toool which may also be used for cleaning substantially the entire periphery areas of the rods comprising the cooking surface of the grill.

Another object is to provide a tool of the above type which may be manufactured without significant increased costs over present day turners or the like.

Briefly, these and other objects of the invention are attained by providing a flat food supporting member, similar to the conventional turner, but having a plurality of notches in at least one edge of the turner. These notches are carefully spaced to engage the rods of a grill, whereby projections defining the sides of the notches extend downwardly between the grill rods. Preferably, the notches are elliptically shaped whereby their engagement with the normally cylindrical rods at an acute angle results in a large peripheral portion of the rods being simultaneously engaged. This arrangement greatly facilitates the manipulation of food on the grill as well as subsequent cleaning. A better understanding of the invention will be had by referring to the accompanying drawings, in which:

Figure 1:
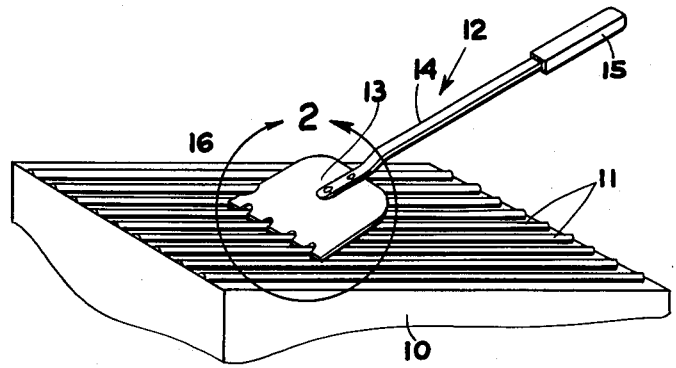
Figure 1 is a perspective view of the grill and food handling and scraping tool of the present invention.

Referring first to Figure 1, there is shown a grill 10 having extending across its upper surface a plurality of equally spaced, cylindrical grill rods 11. In operative position on the grill rods 11 and designated generally by the numeral 12 is a food handling and scraping tool designed in accordance with the present invention. The tool 12 comprises a food supporting, flat member 13, an extension means 14, and an insulated handle 15. In certain applications, the handle 15 need not be required, particularly if the extension means is sufficiently long to avoid any discomfort as a result of heat conduction. In other cases, both the extension means and handle may be replaced by a gripping or holding member which adequately conveys the movement of the operator's hands to the food supporting flat member 13.

Figure 2:
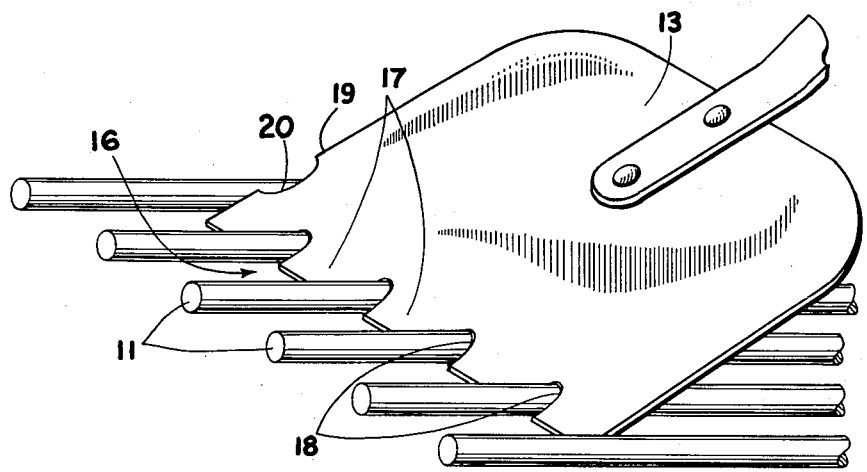
Figure 2 is an enlarged view of that portion of the grill and tool within the circular arrow 2 of Fig. 1.

Flat member 13 is provided with a leading edge 16, the structure of which may be more clearly seen by reference to Figure 2. In Fig. 2, leading edge 16 is shown as having projections 17 defining notches 18, in the form of elliptical curves, having minor axes alined with the straight portion of the leading edge. The notches 18 are equally spaced apart a distance equal to the spacing of grill rods 11.

Flat member 13 is normally used at an acute angle with respect to grill rods 11. When the flat member is in such an angulated position, it will be evident that it is tending to engage a similar angulated cross-section of cylindrical grill rods 11. Such a cross-section will be in the form of an ellipse; consequently, for the closest mating of the notches and grill rods, an elliptical form is desirable. The notches, however, may be varied in shape to mate with the particular angulated cross-section of grill rod being used. For example, if square shaped grill rods were used, the notch might take the form of a portion of a rectangle.

With notches 18 in engagement with grill rods 11, as illustrated in Figure 2, the projections 17 will extend below and forward of the particular food product to be lifted or turned. These projections will then function to lift at least a portion of the food product to enable the flat member 13 to be easily worked under the food product and slide the food back onto the flat member preparatory to the particular manipulation to be effected.

In order that the notches may engage substantially 180 degrees around the periphery of the grill rods 11, the particular elliptical form used should be designed according to the specific diameter of the rods, and according to the angle at which the tool 12 is usually used with respect to the surface of the grill.

When tool 12 is used for cleaning food deposits, grease, and the like from grill rods 11, side edge 19 may be provided with an auxiliary notch 20 in the shape of an elliptical curve, having a major axis alined with the straight portion of side edge 19. Auxiliary notch 20, when brought into an operative position, will serve to clean the side and substantially a half of the bottom periphery of one of the grill rods 11.

Figure 3:
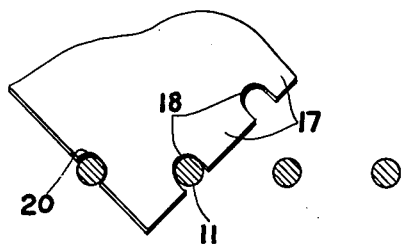
Figure 3 is a fragmentary cross-section of the grill illustrating how the tool of this invention may be used to clean the grill rods.

In order to bring notch 20 into engagement with one of the grill rods 11, the flat member must be tilted upwardly with respect to side edge 19 and then moved downwardly in between two of the grill rods until the tool can be canted with respect to the grill rods, as in the view of Figure 3. It will be apparent from the view of Figure 3 that auxiliary notch 20, in combination with the adjacent notch on the leading edge, will then provide a structure satisfactory for cleaning substantially the entire peripheries of the grill rods 11. In order to ascertain complete cleaning of the rods, the tool 12 may be reversed 180 degrees and the auxiliary notch 20 may then be used to engage the other side of a particular rod.

The tool of the present invention, thus, provides a novel means of turning and lifting food on grills, as well as an effective structure for the subsequent cleaning of the grill rods.

What is claimed is:

1. In combination: a grill comprising a plurality of parallel rods of given circular cross-section and given spacing; and a food handling and scraping tool having a flat member for manipulating food on said grill, at least one edge of said flat member being provided with a plurality of notches, each of said notches being in the form of a portion of an elliptical curve and being spaced apart from each other a distance equal to said given spacing, whereby the rods may be engaged by said notches enabling food products on the grill to be lifted and turned and said rods to be cleaned.

2. A food handling and scraping tool according to claim 1, in which there is provided an auxiliary notch along another edge, other than said one edge, of said flat member.

3. In a food handling and scraping tool: a flat member having a plurality of notches along at least one edge in which each of said notches is shaped to form a portion of an elliptical curve; and in which there is provided an auxiliary notch along another edge, other than said one edge of said flat member.

References Cited in the file of this patent
UNITED STATES PATENTS

| | | |
|---|---|---|
| 904,429 | Heimann | Nov. 17, 1908 |
| 1,723,507 | Haertter | Aug. 6, 1929 |